United States Patent
Liao

(10) Patent No.: US 6,799,537 B1
(45) Date of Patent: Oct. 5, 2004

(54) PET TRAINING DEVICE

(76) Inventor: Yi-Chia Liao, No. 3-6, Sinjhuang, Baishou Village, Shihtan Township, Miaoli County (TW)

(*) Notice: Subject to any disclaimer, the term of this patent is extended or adjusted under 35 U.S.C. 154(b) by 0 days.

(21) Appl. No.: 10/751,408

(22) Filed: Jan. 6, 2004

(51) Int. Cl.$^7$ .............................................. A01K 29/00
(52) U.S. Cl. ........................ 119/720; 119/721; 119/719; 340/573.3
(58) Field of Search ................................ 119/720, 719, 119/721; 340/573.1, 573.3

(56) References Cited

U.S. PATENT DOCUMENTS

| | | | | |
|---|---|---|---|---|
| 6,058,889 A | * | 5/2000 | Van Curen et al. | 119/721 |
| 6,598,563 B2 | * | 7/2003 | Kim et al. | 119/720 |
| 6,615,770 B2 | * | 9/2003 | Patterson et al. | 119/719 |

* cited by examiner

Primary Examiner—Yvonne R. Abbott
(74) Attorney, Agent, or Firm—Birch, Stewart, Kolasch & Birch, LLP

(57) ABSTRACT

Provided is a pet training device comprising a wireless receiving section worn by a pet, the wireless receiving section including a voice unit, a wireless receiving unit, a detection unit, a second microprocessor unit, a second display unit, a motor vibration unit, a high voltage low current discharge unit, and a decoder unit, and a wireless transmission section held by an owner. In a case of the pet continuously barking, the owner may activate the wireless transmission section to control the wireless receiving section to play a recorded message to order the pet to stop barking or if the above failed, even activate the motor vibration unit to generate vibration on the pet or the high voltage low current discharge unit to generate high voltage low current to apply on the pet for stopping barking.

3 Claims, 2 Drawing Sheets

PET TRAINING DEVICE

FIELD OF THE INVENTION

The present invention relates to pet training and more particularly to a pet training device including a wireless receiving section to be worn by a pet and a wireless transmission section to be held by an owner in which the wireless transmission section, as controlled by the owner, is adapted to wirelessly control the wireless receiving section to play a recorded message to order the pet to stop barking or if the above failed, even generate vibration on the pet or generate high voltage low current to apply on the pet for stopping such action.

BACKGROUND OF THE INVENTION

A pet can be kept as a companion or treated with fondness. Hence, recently, pet raising is popular throughout the world due to the improvement of living standard. However, one common problem is that a pet (e.g., dog) may continuously bark at a visitor or due to losing of its temper even it has been trained to be tame for a long period of time. The owner in response may order the pet to stop barking. Unfortunately, the pet may not obey the order in many cases. Thus, it is desirable to provide a novel pet training device capable of effectively taming the pet in case of need.

SUMMARY OF THE INVENTION

It is an object of the present invention to provide a pet training device comprising a wireless receiving section to be worn by a pet, the wireless receiving section including a voice unit, a wireless receiving unit, a detection unit, a second microprocessor unit, a second display unit, a motor vibration unit, a high voltage low current discharge unit, and a decoder unit, and a wireless transmission section to be held by an owner. In a case of the pet continuously barked, the owner may activate the wireless transmission section to wirelessly control the wireless receiving section to play a recorded message to order the pet to stop barking or if the above failed, even activate the motor vibration unit generate vibration on the pet or the high voltage low current discharge unit generate high voltage low current to apply on the pet for stopping barking.

The above and other objects, features and advantages of the present invention will become apparent from the following detailed description taken with the accompanying drawings.

DETAILED DESCRIPTION OF THE PREFERRED EMBODIMENTS

Figure 1:
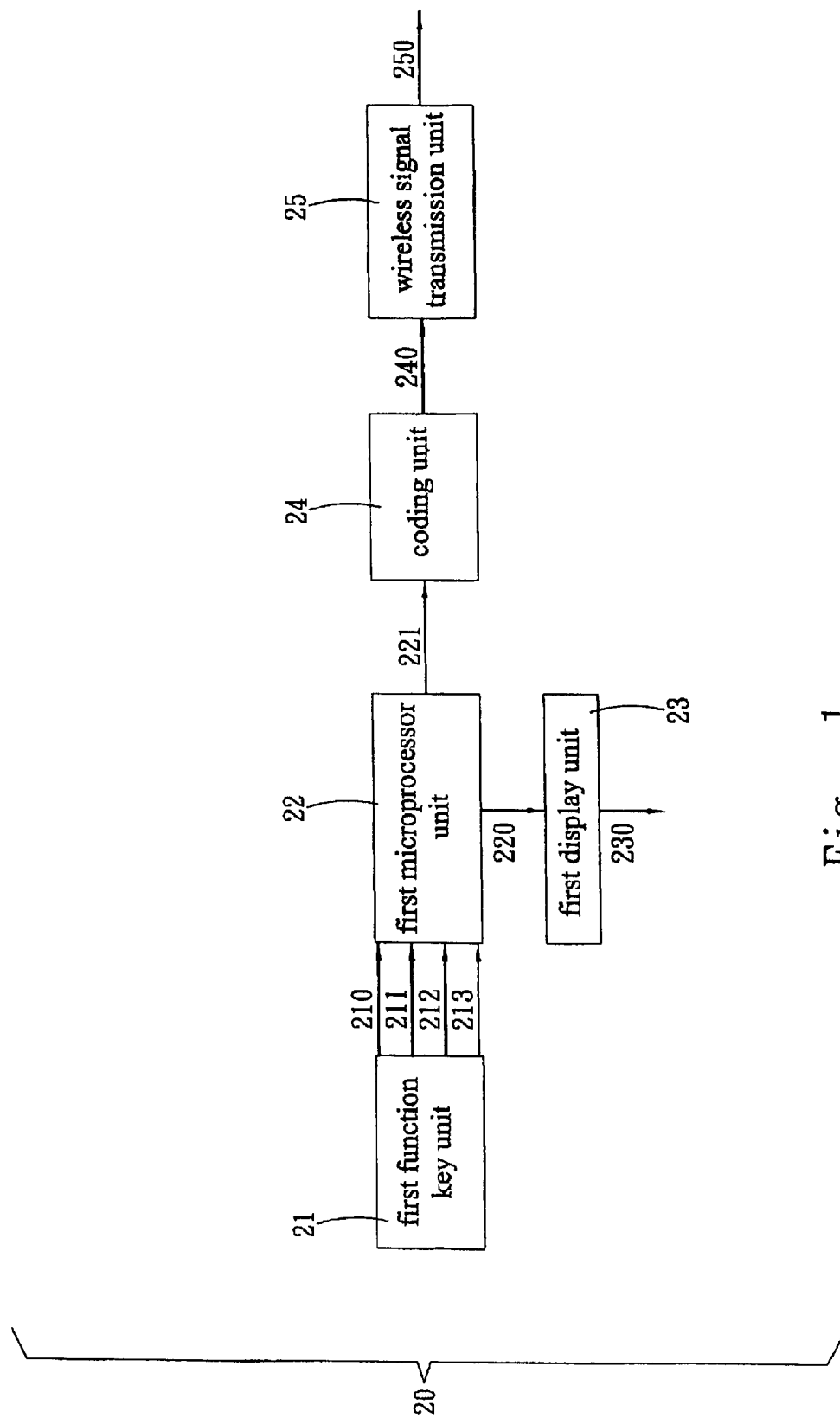
FIG. 1 is a block diagram of a wireless transmission section of a pet training device according to the invention.
Figure 2:
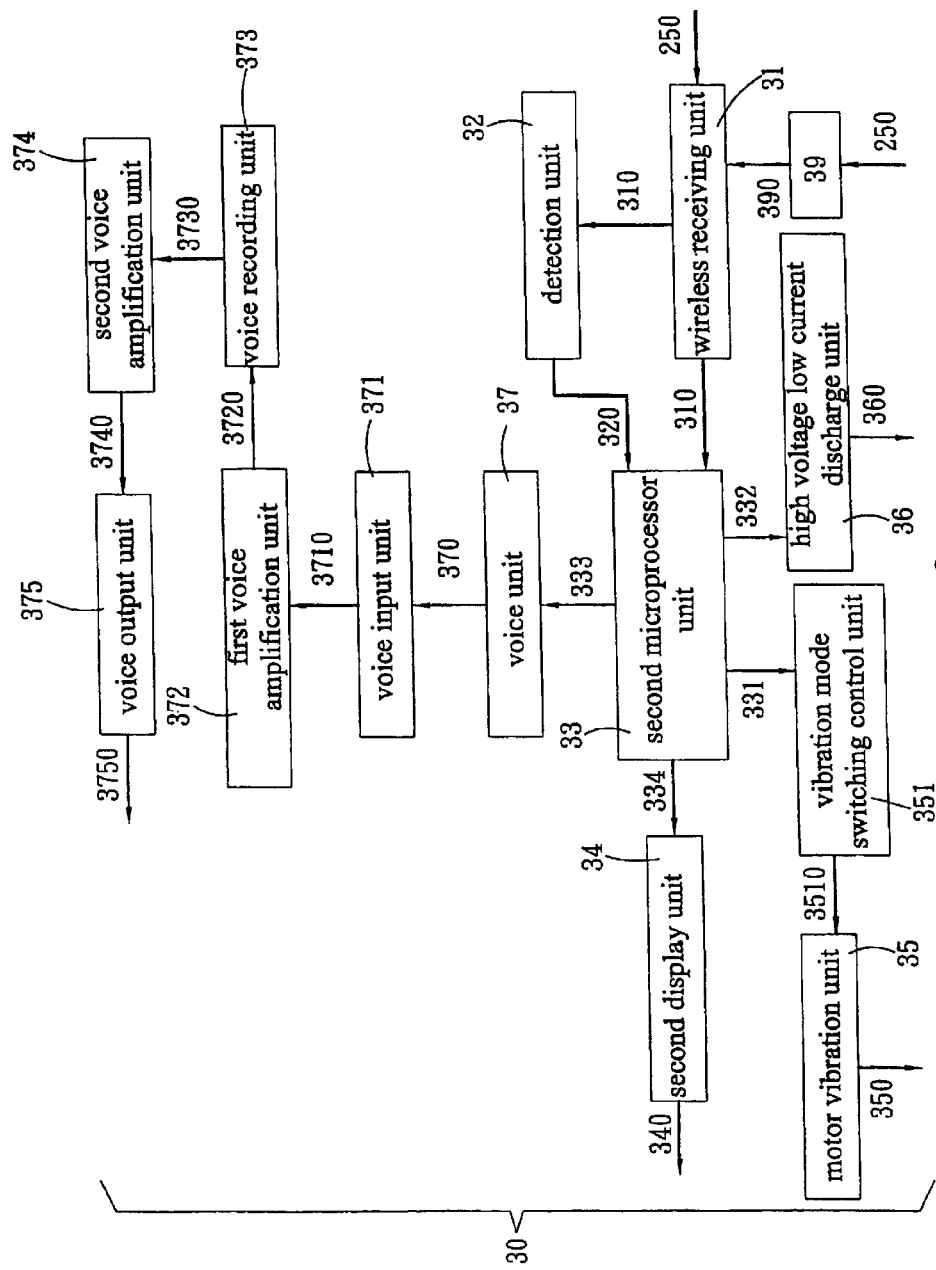
FIG. 2 is a block diagram of a wireless receiving section of the pet training device according to the invention.

Referring to FIGS. 1 and 2, there is shown a pet training device constructed in accordance with the invention. The device comprises a wireless transmission section 20 to be held by an owner and a wireless receiving section 30 to be worn by a pet (e.g., dog in this embodiment). Each component will be described in detail below. Referring to FIG. 1 specifically, the wireless transmission section 20 comprises a first function key unit 21, a first microprocessor unit 22, a first display unit 23, a coding unit 24, and a wireless signal transmission unit 25. In operation, the first function key unit 21 is adapted to generate one of a plurality of function trigger signals including a vibration trigger signal 210, a voice trigger signal 211, a high voltage low current discharge trigger signal 212, and a pet distance control trigger signal 213 and send the said trigger signals to the first microprocessor unit 22.

The first microprocessor unit 22 is adapted to receive the function trigger signals (including the vibration trigger signal 210, the voice trigger signal 211, the high voltage low current discharge trigger signal 212, and the pet distance control trigger signal 213) from the first function key unit 21 and is then adapted to generate an output first display trigger signal 220 to the first display unit 23. The first display unit 23 is implemented as a liquid crystal display (LCD). In response to the first display trigger signal 220, the first display unit 23 generates a first display output signal 230. Thus, a pet owner may know the type of function trigger signal that the first function key unit 21 is generating.

The first microprocessor unit 22 is also adapted to generate an output first function trigger signal 221 to the coding unit 24. In response, the coding unit 24 converts the first function trigger signal 221 into a series signaling to coding. And the coding trigger signals 240 which are sent to the wireless signal transmission unit 25 by an oscillation modulation circuit (not shown). In response, the wireless signal transmission unit 25 generates an output wireless transmission trigger signal 250.

Referring to FIG. 2 specifically, the wireless receiving section 30 comprises a wireless receiving unit 31, a detection unit 32, a second microprocessor unit 33, a second display unit 34, a motor vibration unit 35, a high voltage low current discharge unit 36, a voice unit 37, and a decoder unit 39. In operation, the decoder unit 39 is adapted to receive the wireless transmission trigger signal 250 from the wireless signal transmission unit 25 for decoding and then sending a decoding trigger signal 390 to the wireless receiving unit 31.

The wireless receiving unit 31 is adapted to generate an output wireless receiving trigger signal 310 to each of the detection unit 32 and the second microprocessor unit 33. In response to receiving the wireless receiving trigger signal 310, the second microprocessor unit 33 will determine the type of the function trigger signal prior to generating a corresponding trigger signal. For example, in response to receiving the vibration trigger signal 210 or the high voltage low current discharge trigger signal 212, the second microprocessor unit 33 will generate an output vibration output trigger signal 331 to the motor vibration unit 35 or generate an output high voltage low current discharge output trigger signal 332 to the high voltage low current discharge unit 36. As an end, either the motor vibration unit 35 or the high voltage low current discharge unit 36 will generate a vibration output signal 350 or a high voltage low current discharge output signal 360.

Also, the second display unit 34 is adapted to receive a second display trigger signal 334 from the second microprocessor unit 33. The second display unit 34 is implemented as a LCD. The second display unit 34 will generate a corresponding second display signal 340 in response to the second display trigger signal 334. As an end, the owner may know the type of the function trigger signal (e.g., the vibration output trigger signal 331, the high voltage low current discharge output trigger signal 332, or the voice output trigger signal 333) being generated by the pet training device by watching the second display signal 340 shown on the second display unit 34.

Also, the voice unit 37 is adapted to receive an output voice output trigger signal 333 from the second microprocessor unit 33 and generate a voice output signal 370 in response. The voice unit 37 comprises a voice input unit 371, a first voice amplification unit 372, a voice recording unit 373, a second voice amplification unit 374, and a voice output unit 375. The voice input unit 371 is adapted to generate an output voice input trigger signal 3710 to the first voice amplification unit 372. In response, the first voice amplification unit 372 is adapted to amplify the voice input trigger signal 3710 for generating a first voice amplification trigger signal 3720 which is in turn sent to the voice recording unit 373. In response, the voice recording unit 373 records a first voice amplification trigger signal 3720 and generates a recorded voice trigger signal 3730 which in turn is sent to the second voice amplification unit 374. In response to receiving the recorded voice trigger signal 3730, the second voice amplification unit 374 generates an output second voice amplification trigger signal 3740 to the voice output unit 375. In response to receiving the second voice amplification trigger signal 3740, the voice output unit 375 generates a voice output signal 3750.

By configuring as above, an owner may activate the wireless transmission section 20 of the pet training device to wirelessly activate the voice unit 37 to generate the voice output signal 3750 (i.e., implemented as a recorded voice such as "stop barking") for ordering the pet to obey the same. If the above failed, the owner may further activate the wireless transmission section 20 to wirelessly activate the motor vibration unit 35 and the high voltage low current discharge unit 36 to generate a vibration output signal 350 or a high voltage low current discharge output signal 360 respectively. As an end, vibration is occurred on the pet or high voltage low current is applied on the pet respectively for stopping the barking action.

The motor vibration unit 35 comprises a vibration mode switching control unit 351. The vibration mode switching control unit 351 is adapted to operate in one of a plurality of vibration modes (e.g., a continuous vibration mode, an arbitrary vibration mode, or a mode having a vibration interval of several seconds). In response to receiving the vibration output trigger signal 331 from the second microprocessor unit 33, the vibration mode switching control unit 351 will generate a corresponding vibration mode signal 3510 in proportion to the strength of the vibration output signal 331. The vibration mode signal 3510 is then sent to the motor vibration unit 35. As such, the owner can select an appropriate vibration mode based on the action of a pet being seen.

Moreover, the detection unit 32 is adapted to detect the strength of the wireless receiving trigger signal 310 output from the wireless receiving unit 31. In a case of the detection unit 32 detected a weak wireless receiving trigger signal 310, the detection unit 32 generates a detection trigger signal 320 and sends the same to the second microprocessor unit 33. As such, the second microprocessor unit 33 will generate a voice output signal 333 and send the same to the voice unit 37 in response to the weak signal. In another case of the detection unit 32 detected a weaker wireless receiving signal 310, the detection unit 32 generates a vibration output trigger signal 331 and sends the same to the motor vibration unit 35. In still another case of the detection unit 32 detected no signal, the detection unit 32 generates a high voltage low current discharge output enable trigger signal 332 and sends the same to the high voltage low current discharge unit 36.

By configuring as above, when an owner carries a pet to stroll and the pet is suddenly demonstrating an irrational action, the owner may activate the wireless transmission section 20 to transmit a pet distance control trigger signal 213 to activate the detection unit 32 of the wireless receiving section 30. In response, the wireless receiving section 30 will perform one of the following actions based on the strength of the wireless transmission signal 250 detected by the detection unit 32. As a result, the owner can operate the pet training device to effectively tame the pet within a predetermined distance therebetween in case of need.

While the invention herein disclosed has been described by means of specific embodiments, numerous modifications and variations could be made thereto by those skilled in the art without departing from the scope and spirit of the invention set forth in the claims.

What is claimed is:

1. A pet training device, comprising:

a wireless transmission section to be held by an owner and comprising:

a first function key unit for generating one of a plurality of function trigger signals including a voice trigger signal, a vibration trigger signal, a high voltage low current discharge trigger signal, and a pet distance control trigger signal;

a first microprocessor unit for receiving the function trigger signal from the first function key unit so as to generate a first display trigger signal and a first function trigger signal in response;

a first display unit for receiving the first display trigger signal output from the first microprocessor unit so as to generate a first display output signal;

a coding unit for receiving the first function enable trigger signal and converting the same into coding trigger signals; and a wireless signal transmission unit for receiving the coding trigger signals and generating a wireless transmission trigger signal as output; and a wireless receiving section to be worn by a pet and comprising:

a decoder unit for receiving the wireless transmission trigger signal from the wireless signal transmission unit and decoding the same to generate a decoding trigger signal;

a wireless receiving unit for receiving the decoding trigger signal output from the decoder unit and generating a wireless receiving trigger signal;

a detection unit for detecting strength of the wireless receiving trigger signal output from the wireless receiving unit and generating a detection trigger signal;

a second microprocessor unit for receiving the wireless receiving trigger signal from the wireless receiving unit and the detection trigger signal from the detection unit and generating a vibration output trigger signal, a high voltage low current discharge output trigger signal, a voice output trigger signal, and a second display trigger signal;

a second display unit for receiving the second display trigger signal output from the second microprocessor unit and generating a second display signal in response;

a motor vibration unit for receiving the vibration output trigger signal output from the second microprocessor unit and generating a vibration output signal;

a high voltage low current discharge unit for receiving the high voltage low current discharge output trigger signal output from the second microprocessor unit and generating a high voltage low current discharge output signal; and a voice unit for receiving the voice output trigger signal from the second microprocessor unit and generating a voice output signal.

2. The pet training device of claim 1, wherein the voice unit comprises:

a voice input unit for generating a voice input trigger signal;

a first voice amplification unit for receiving the voice input trigger signal from the voice input unit and generating a first voice amplification trigger signal;

a voice recording unit for recording the first voice amplification trigger signal output from the first voice amplification unit and generating a recorded voice trigger signal;

a second voice amplification unit for receiving the recorded voice trigger signal from the voice recording unit and generating a second voice amplification trigger signal; and a voice output unit for receiving the second voice amplification trigger signal output from the second voice amplification unit and generating a voice output signal.

3. The pet training device of claim 1, wherein the motor vibration unit comprises vibration mode switching control means being operated in one of a plurality of vibration modes.

\* \* \* \* \*